United States Patent
Ueno et al.

(10) Patent No.: US 9,153,372 B2
(45) Date of Patent: Oct. 6, 2015

(54) INDUCTOR AND MANUFACTURING METHOD THEREFOR

(75) Inventors: Yasuhiro Ueno, Toyota (JP); Fumio Nomizo, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/129,176

(22) PCT Filed: Jun. 27, 2011

(86) PCT No.: PCT/JP2011/064686
§ 371 (c)(1),
(2), (4) Date: Dec. 24, 2013

(87) PCT Pub. No.: WO2013/001591
PCT Pub. Date: Jan. 3, 2013

(65) Prior Publication Data
US 2014/0125440 A1 May 8, 2014

(51) Int. Cl.
| H01F 27/06 | (2006.01) |
| H01F 37/00 | (2006.01) |
| H01F 27/02 | (2006.01) |
| H01F 41/12 | (2006.01) |
| H01F 41/00 | (2006.01) |

(52) U.S. Cl.
CPC .............. *H01F 27/06* (2013.01); *H01F 27/022* (2013.01); *H01F 37/00* (2013.01); *H01F 41/005* (2013.01); *H01F 41/127* (2013.01)

(58) Field of Classification Search
CPC .......... H01F 27/26; H01F 27/24; H01F 27/28
USPC ...................................... 336/65, 83, 212, 210
See application file for complete search history.

(56) References Cited

U.S. PATENT DOCUMENTS

| 2,911,604 | A | 11/1959 | Krause |
| 4,311,978 | A | 1/1982 | Crockett et al. |
| 4,891,620 | A | 1/1990 | Cheng |

(Continued)

FOREIGN PATENT DOCUMENTS

| CN | 101689420 A | 3/2010 |
| EP | 2315220 A1 | 4/2011 |

(Continued)

OTHER PUBLICATIONS

International Search Report of PCT/JP2011/064686 dated Aug. 16, 2011.

(Continued)

*Primary Examiner* — Tuyen Nguyen
(74) *Attorney, Agent, or Firm* — Sughrue Mion, PLLC (57) ABSTRACT

An inductor that has the following: an inductor core comprising a plurality of core members arranged in a ring with gaps therebetween; primary insert-molded resin parts comprising a thermoplastic resin covering the outside surface of the inductor core, excluding the surfaces of the core members that face each other; coils disposed around the aforementioned gaps and the primary insert-molded resin parts on the inductor core; and secondary insert-molded resin parts comprising a thermoplastic resin insert-molded around the coils to affix said coils to the inductor core. This allows high-cycle manufacturing of inductors without a thermosetting-resin potting step in a vacuum furnace or a heat curing treatment in a heating furnace.

8 Claims, 10 Drawing Sheets

(56) References Cited

U.S. PATENT DOCUMENTS

| | | |
|---|---|---|
| 5,210,514 A | 5/1993 | Ito et al. |
| 5,719,544 A | 2/1998 | Vinciarelli et al. |
| 5,977,855 A | 11/1999 | Matsumura et al. |
| 6,143,157 A | 11/2000 | Andrus et al. |
| 8,049,590 B2 | 11/2011 | Huh et al. |
| 8,279,035 B2 | 10/2012 | Yoshikawa et al. |
| 8,749,335 B2 | 6/2014 | Ueno et al. |
| 2002/0014941 A1 | 2/2002 | Yoshioka et al. |
| 2009/0108971 A1 | 4/2009 | Okamoto |
| 2010/0209314 A1 | 8/2010 | Sato |
| 2011/0156853 A1 | 6/2011 | Kato et al. |
| 2014/0125440 A1 | 5/2014 | Ueno et al. |

FOREIGN PATENT DOCUMENTS

| | | |
|---|---|---|
| JP | 57-035021 U | 2/1982 |
| JP | 58-008926 U | 1/1983 |
| JP | 60-061709 U | 4/1985 |
| JP | 62-219607 A | 9/1987 |
| JP | 2-056910 A | 2/1990 |
| JP | 3-38603 U | 4/1991 |
| JP | 05-021242 A | 1/1993 |
| JP | 6-045322 U | 6/1994 |
| JP | 06-198669 A | 7/1994 |
| JP | 7-007123 U | 1/1995 |
| JP | 7-130916 A | 5/1995 |
| JP | 7-283032 A | 10/1995 |
| JP | 8-057981 A | 3/1996 |
| JP | 08-181022 A | 7/1996 |
| JP | 11-204343 A | 7/1999 |
| JP | 11-345715 A | 12/1999 |
| JP | 2000-200726 A | 7/2000 |
| JP | 2003-051414 A | 2/2003 |
| JP | 2004-095570 A | 3/2004 |
| JP | 2005-072199 A | 3/2005 |
| JP | 2007-134513 | 5/2007 |
| JP | 2007-180140 A | 7/2007 |
| JP | 2009-027000 A | 2/2009 |
| JP | 2009-032922 A | 2/2009 |
| JP | 2009-099793 A | 5/2009 |
| JP | 2009-259986 A | 11/2009 |
| JP | 2010-103307 A | 5/2010 |
| JP | 2010-171209 A | 8/2010 |
| JP | 2010-226138 A | 10/2010 |
| JP | 2010-272584 A | 12/2010 |
| JP | 2011-029336 A | 2/2011 |
| JP | 2011-082412 A | 4/2011 |
| JP | 2011-086657 A | 4/2011 |
| JP | 2011-086801 A | 4/2011 |
| JP | 2013-140827 A | 7/2013 |
| JP | 5626466 B2 | 11/2014 |
| WO | 2013/001591 A1 | 1/2013 |
| WO | 2013/001593 A1 | 1/2013 |

OTHER PUBLICATIONS

Final Office Action dated Oct. 10, 2014, issued by the United States Patent and Trademark Office in counterpart U.S. Appl. No. 13/394,677.
Non-Final Office Action dated Jun. 19, 2014, issued by the United States Patent and Trademark Office in counterpart U.S. Appl. No. 13/394,677.
Communication dated Oct. 29, 2013, issued by the United States Patent and Trademark Office in counterpart U.S. Appl. No. 13/813,598.
Notice of Allowance dated Jan. 22, 2014, issued by the United States Patent and Trademark Office in counterpart U.S. Appl. No. 13/813,598.
Final Office Action dated Oct. 10, 2014, issued by the U.S. Patent and Trademark Office in U.S. Appl. No. 13/394,677.
Communication dated Mar. 4, 2015 from the United States Patent and Trademark Office in counterpart U.S. Appl. No. 13/394,677.
Communication dated Jul. 2, 2015 from the United States Patent and Trademark Office in U.S. Appl. No. 13/394,677.

FIG. 10

INDUCTOR AND MANUFACTURING METHOD THEREFOR

CROSS REFERENCE TO RELATED APPLICATIONS

This is a National Stage of International Application No. PCT/JP2011/064686 filed Jun. 27, 2011, the content of all of which is incorporated herein by reference in its entirety.

TECHNICAL FIELD

The present invention relates to a reactor and to a method for manufacturing the same, and in particular, to a reactor mounted on an electric vehicle, hybrid vehicle, or the like and to a method for manufacturing the same.

BACKGROUND ART

Conventionally, a reactor is built in as a part of an electric conversion circuit mounted on an electrically driven vehicle such as a hybrid vehicle. Such a reactor is used in a converter or the like which boosts DC electric power supplied from a battery and outputs the boosted DC electric power to a motor which is a power source.

A reactor generally includes two or more core members made from a magnetic material; a reactor core which is formed by joining the core members in an annular shape with a non-magnetic gap plate sandwiched therebetween; and a coil positioned around a coil mounting position of the reactor core including the gap plate. The reactor including the reactor core and the coil is mounted on a vehicle in a state that the reactor is fixed within a case made from a metal such as aluminum alloy, by means of a bolt or the like.

As a conventional art document related to such a reactor, for example, JP 2009-99793 A (Patent Document 1) discloses a manufacturing method of a reactor which includes enclosing and fixing a reactor core with a coil in a housing; and fixing the reactor in the housing by filling and hardening a silicon resin among the housing, the reactor core, and the coil.

Further, JP 2009-27000 A (Patent Document 2) discloses a reactor device in which a core unit is formed with two or more I-shaped magnetic cores which are joined with a gap therebetween; a reactor core is formed in a generally annular shape by joining magnetic U-shaped cores between ends of two of the core units; a coil is formed around periphery of the core unit to form a reactor; and a resin mold body is formed between the reactor and the housing with the reactor enclosed within the housing. It is described that in this reactor device, the resin mold body is formed where the coils of the reactor are formed; whereas the resin mold body is not formed between the U-shaped cores and the housing.

RELATED ART DOCUMENTS

Patent Documents

Patent Document 1: JP 2009-99793 A
Patent Document 2: JP 2009-27000 A

DISCLOSURE OF THE INVENTION

Problems to be Solved by the Invention

In the reactors of Patent Documents 1 and 2, an annular reactor core in which a coil is assembled is enclosed within a housing. A potting process is performed in which a thermo-setting silicon resin is injected and filled in a space among the housing, the reactor core, and the coil. The coil is fixed with the reactor core by hardening the silicon resin in a heating process, while ensuring high heat dissipation properties from the coil to the housing by providing therebetween a silicon resin having a high thermal conductivity.

In the potting process such as that described above, heat dissipation properties from the coil to the housing are prevented if the injected silicone resin includes bubbles, which may cause formation of a heat-insulating layer. Thus, in order to prevent the entry of bubbles, the silicone resin potting should be performed within a vacuum furnace in a vacuum state.

Further, in order to sufficiently harden the potted silicon resin, the reactor must be held within a heating furnace for applying a heating process for about 2 to 3 hours, resulting in a longer manufacturing cycle of reactors.

An object of the present invention is to provide a reactor and a method for manufacturing the reactor which enable short-cycle manufacturing by eliminating a potting process of thermosetting resin within a vacuum furnace and a thermosetting process within a heating furnace.

Means for Solving the Problems

A reactor according to one aspect of the present invention comprises a reactor core formed by a plurality of core members which are joined in an annular shape via gap portions; a first insert molding resin portion made from a thermoplastic resin covering an outer circumferential surface of the reactor core except for at least opposing surfaces of the core members; a coil positioned around the gap portions and the first insert molding resin portion of the reactor core; and a second insert molding resin portion which is insert molded around the coil to fix the coil to the reactor core, the second insert molding resin portion being made from a thermoplastic resin.

In a reactor according to the present invention, the second insert molding resin portion may include a coil exposed portion in which the coil is exposed at a position where the reactor faces a reactor mounting member on which the reactor is mounted; and the coil exposed portion may contact a heat dissipation material and the heat dissipation material in turn may contact the reactor mounting member.

Further, in a reactor according to the present invention, the second insert molding resin portion may be made from a resin material having thermal conductivity higher than that of the first insert molding resin portion.

Further, in a reactor according to the present invention, the first insert molding resin portion or the second insert molding resin portion may include a fastening portion unitedly formed therewith, the fastening portion being adapted to bolt the reactor onto the reactor mounting member.

A method for manufacturing a reactor according to another aspect of the present invention comprises a reactor core formed by a plurality of core members which are joined in an annular shape via gap portions and a coil provided around the reactor core including the gap portions, the method comprising: preparing the plurality of core members and the coil; forming a first insert molding resin portion made from a thermoplastic resin to cover an outer circumferential surface of the core members except for at least opposing surfaces of the core members; joining the plurality of core members in an annular shape via the gap portions with the core members inserted into the coil; and forming a second insert molding resin portion made from a thermoplastic resin around the coil positioned around the gap portions and the first insert molding resin portion of the reactor core to fix the coil to the reactor core.

In a method for manufacturing the reactor according to the present invention, when forming the second insert molding resin portion, a coil exposed portion in which the coil is exposed may be formed at a position where the reactor faces a reactor mounting member on which the reactor is mounted, and the coil exposed portion may be assembled such that the coil exposed portion contacts a heat dissipation material and the heat dissipation material in turn contacts the reactor mounting member.

Further, in a method for manufacturing the reactor according to the present invention, the second insert molding resin portion may be made from a resin material having heat conductivity higher than that of the first insert molding resin portion.

Furthermore, in a method for manufacturing a reactor according to the present invention, when forming the first insert molding resin portion or the second insert molding resin portion, a fastening portion which is adapted to bolt the reactor to the reactor mounting member may be unitedly formed.

Effects of the Invention

According to a reactor and a method for manufacturing the same according to the present invention, a coil positioned around gap portions and a first insert molding resin portion of a reactor core is fixed by a second insert molding resin portion made from a thermoplastic resin. This allows elimination of a potting process of thermosetting resin within a vacuum furnace and a thermosetting process within a heating furnace, thereby enabling short-cycle manufacturing of reactors.

BEST MODE FOR CARRYING OUT THE INVENTION

Embodiments according to the present invention (hereinafter referred to as "embodiments") are described below by referring to the attached drawings. In the description, specific shapes, materials, numerals, direction, or the like are provided merely as examples in order to facilitate understanding of the present invention, and are appropriately changeable in accordance with usages, purposes, and specifications. It has been assumed that, with two or more embodiments or variations included in the description below, the described features can be appropriately combined for use.

Figure 1:
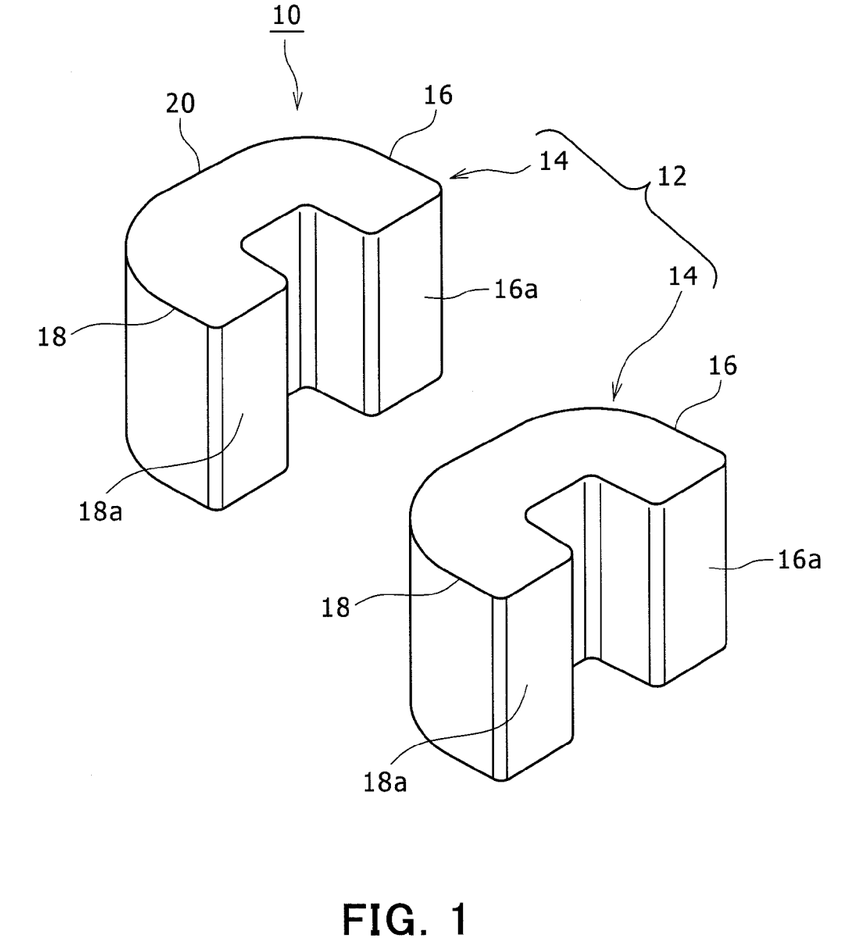
FIG. 1 is a perspective diagram showing core members of a reactor core forming a reactor according to one embodiment of the present invention.

FIG. 1 is a perspective diagram showing reactor core members 14 of a reactor core 12 forming a reactor 10 according to one embodiment of the present invention. The reactor core 12 according to the present embodiment is formed from two core members 14 which have identical shapes.

Each of the core members 14 is formed to have a general U-shape in a planar view. The core member 14 includes a first leg portion 16 and a second leg portion 18, which extend in parallel to each other, and a connecting portion 20 which has a general curved shape connecting between the leg portions 16, 18. Further, the core members 14 are preferably formed from a pressurized powder magnetic core which is formed by applying pressure to resin-coated magnetic powder mixed with binder. However, the core members 14 may be formed from a steel laminate in which a large number of electromagnetic steel plates punched in a general U-shape are laminated and unitedly bound together by crimping or the like.

The first and second leg portions 16, 18 of each core member 14 respectively include rectangular end surfaces 16a, 18a. These end surfaces 16a, 18a are opposing surfaces when the two core members 14 are placed to oppose each other via gap members to form a general annular shape.

Figure 2:
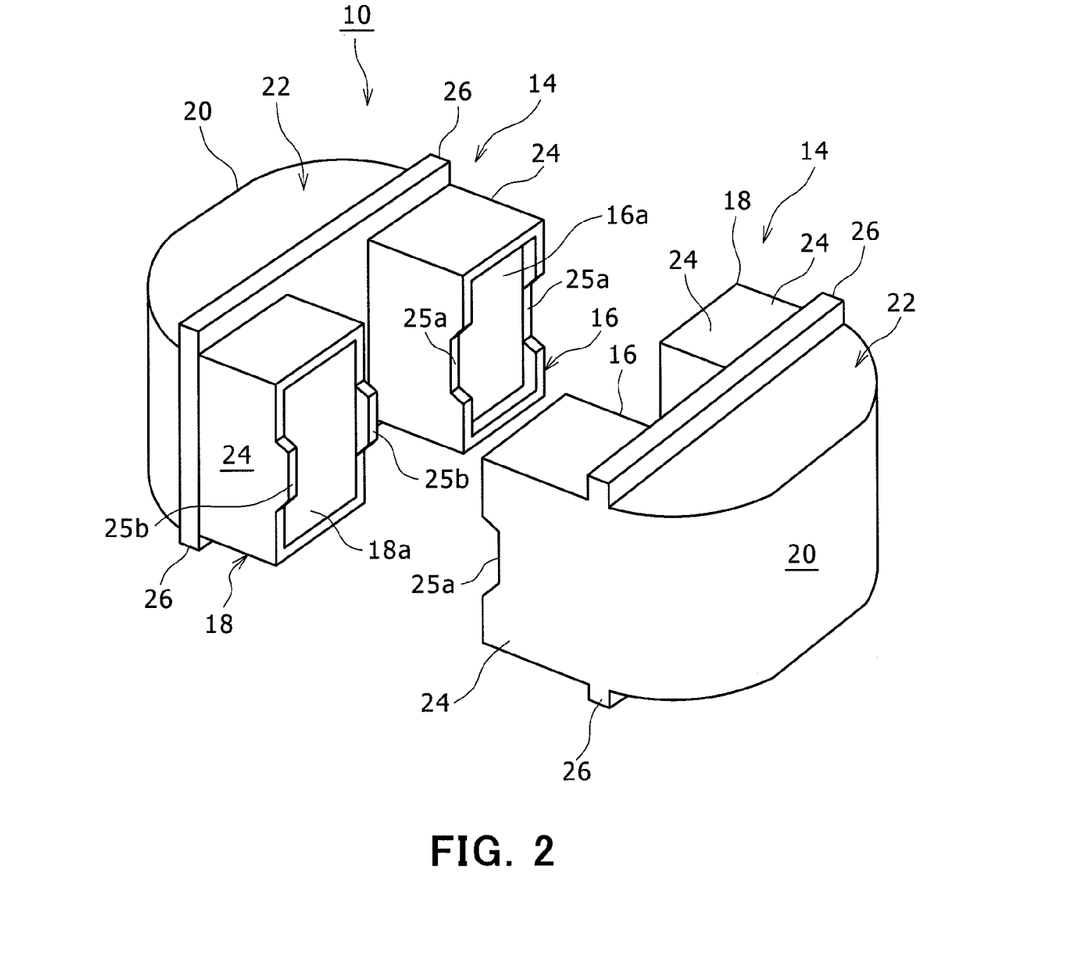
FIG. 2 is a perspective diagram showing first insert molding resin portions made from a thermoplastic resin formed on the core members shown in FIG. 1.

FIG. 2 is a perspective diagram showing first insert molding resin portions 22 made from a thermoplastic resin formed on the core members 14 shown in FIG. 1. The core members 14 are covered with the first insert molding resin portions 22 over the entire outer circumferential surfaces thereof except for the leg end surfaces 16a, 18a. The first insert molding resin portions 22 are formed by injecting thermoplastic resin with the core members 14 mounted inside a mold.

Each insert molding resin portion 22 includes leg cover portions 24 which respectively cover side surfaces of the leg portions 16, 18. As described below, the leg cover portions 24 function to ensure an insulation distance between the coil and the reactor core when the coils are positioned around the leg portions 16, 18.

Further, the first insert molding resin portion 22 includes wall portions 26, each of which protrudes from the bottom and top surface. The wall portions 26 have a function to position the coil by abutting or substantially abutting end surfaces of the coil when the coil is disposed around the leg portions 16, 18.

Further, in the first insert molding resin portion 22, the leg cover portion 24 of the first leg portion 16 includes an edge portion which is formed to have a rectangular frame shape and protrudes from the end surface 16a of the first leg portion 16. In the protruding portion, recess portions 25a, each of which is formed to be recessed in a trapezoid shape, are formed on right and left side portions opposing each other. On the contrary, the leg cover portion 24 of the second leg portion 18 includes an edge portion which is formed to have a rectangular frame shape and be substantially flat with the end surface 18a of the second leg portion 18. Protruding portions 25b, each of which is formed to protrude in a trapezoid shape, are formed on the right and left side portions opposing each other.

Both of the two core members 14 forming the reactor core 12 include the first insert molding resin portions 22 as described above. As shown in FIG. 2, one of the core members 14 is positioned in a reversed direction such that the first leg portion 16 of one of the two core members 14 oppose the second leg portion 18 of the other core member 14. In this way, with the two core members 14 joined in an annular shape, the recess portions 25a formed with the leg cover portion 24 of the first leg portion 16 engage with the protruding portions 25b formed with the leg cover portion 24 of the second leg portion 18 to enable accurately setting of the distance between the end surfaces 16a, 18a of the first and the second leg portions 16, 18 opposing each other (in other words, the distance of the gap portion).

Each of the first insert molding resin portions 22 may include recess portions and protruding portions similar to those described above on the two side portions on the top and bottom opposing each other on the leg cover portions 24 which are formed around the end surfaces 16a, 18a in a rectangular frame shape. In this way, when joining the two core members 14, the core members 14 can be relatively positioned in the horizontal direction in a reliable manner. Further, the above-described recess portion and the protruding portion may be dedicated to a function to position the opposing legs in a vertical and/or horizontal direction alone, while the position in the opposing direction is defined by the end surfaces of the leg cover portion other than the recess portions and the protruding portions by abutting each other so as to define the distance of the gap portion.

Further, because the first insert molding resin portion 22 is formed to cover the entire outer circumferential surface of the core member 14 except for the end surfaces 16a, 18a, the first insert molding resin portion 22 has a protective function to prevent damage of the core members 14 which are made from pressurized powder magnetic core and are thus relatively low in strength and easily broken. When the reactor is mounted in a metal case as described below, the first insert molding resin portion 22 also functions to ensure insulation properties between the core members 14 and the metal case.

Figure 3:
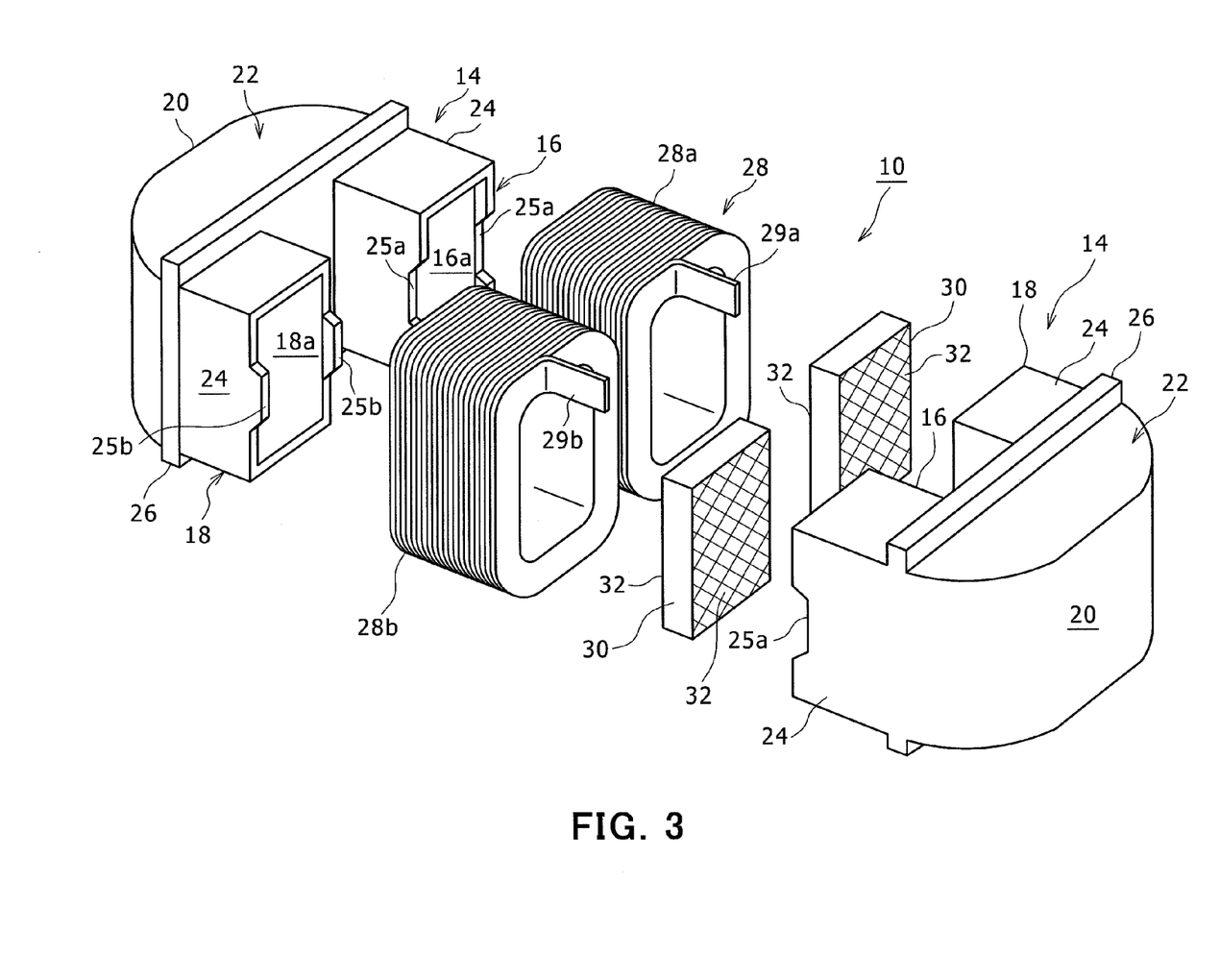
FIG. 3 is an exploded perspective diagram showing how the two core members shown in FIG. 2, a coil, and two gap plates are to be assembled.

FIG. 3 is an exploded perspective diagram showing a view in which the two core members 14, a coil 28, and two gap plates 30 are assembled.

The coil 28 of the reactor 10 according to this embodiment is, for example, an edgewise coil which is formed in advance by winding, around a former, flat square wire to which insulation film processing is applied with, for example, enamel. The coil 28 is formed from two coil portions 28a, 28b which are connected in series. Each of the coil portions 28a, 28b is formed by winding one continuous piece of flat square wire.

Specifically, assuming that a wire end portion 29a of the coil portion 28a is the start of the winding, the coil portion 28a is formed by winding the flat square wire counter-clockwise which continues to the other coil portion 28b. The flat square wire is then wound clockwise to form the coil portion 28b until the end portion 29b. The wire end portions 29a, 29b extended from the coil portions 28a, 28b are connected to input and output terminals of electric power for the coil 28 (that is, a reactor 10).

Further, the coil portions 28a, 28b are formed to have a generally rectangular internal circumferential shape which is slightly larger than the leg cover portions 24 formed on the outer circumference of the leg portions 16, 18 of the core members 14. In this way, the leg portions 16, 18 of the core members 14 can be inserted into the coil portions 28a, 28b. Further, the length of the coil portions 28a, 28b in an axial direction is arranged to be slightly shorter than the distance between the wall portions 26 of the first insert molding resin portions 22 of the two core members 14 which are joined in an annular shape. In this way, when the reactor core 12 is assembled, the coil portions 28a, 28b can be positioned with slight flexibility between the two wall portions 26.

Each of the gap plates 30 is a rectangular plate member made from a non-magnetic material. For example, a ceramic plate such as alumina is preferably used. When the reactor is assembled, adhesive agent 32 is applied onto the both sides of each of the gap plates 30, as one of these sides of each of the gap plates 30 is shown with cross-hatching in FIG. 3. In this way, when the two core members 14 are assembled in an annular shape with the leg portions 16, 18 inserted into the coil portions 28a, 28b, the two core members 14 are adhesively attached each other with the gap plates 30 sandwiched between the end surfaces 16a, 18b of the first leg portion 16 and the second leg portions 18. Therefore, in the reactor according to the present embodiment, the gap portions formed between the two core members 14 are formed by the gap plates 30 and the adhesive agent layers.

As the above adhesive agent, a thermosetting adhesive agent with a strong adhesive strength and high heat resistance such as epoxy resin is preferably used. Even in a case with such a thermosetting adhesive agent, it is possible as described below to sufficiently harden the agent by using heat of molten resin which forms the second insert molding resin, whereby it is possible to ensure sufficient adhesive strength in a short time.

However, the adhesive agent is not limited to a thermosetting type agent. For example, a room temperature curing type adhesive agent may be used. Further, the adhesive agent may be applied in advance, onto the end surfaces 16a, 18a of the core members 14 instead of the gap plates 30. Further, because the gap distance between the end surfaces 16a, 18a of the first and the second leg portions 16, 18 opposing those of the other leg portion can be accurately defined by the engagement of the recess portions 25a with the protruding portions 25b when the two core members 14, each including the first insert molding resin portions 22, are joined, the gap portion may be formed by a predetermined amount of adhesive agent without the gap plates. In this way, the number of required parts and cost can be reduced and the assembly becomes easier.

Figure 4:
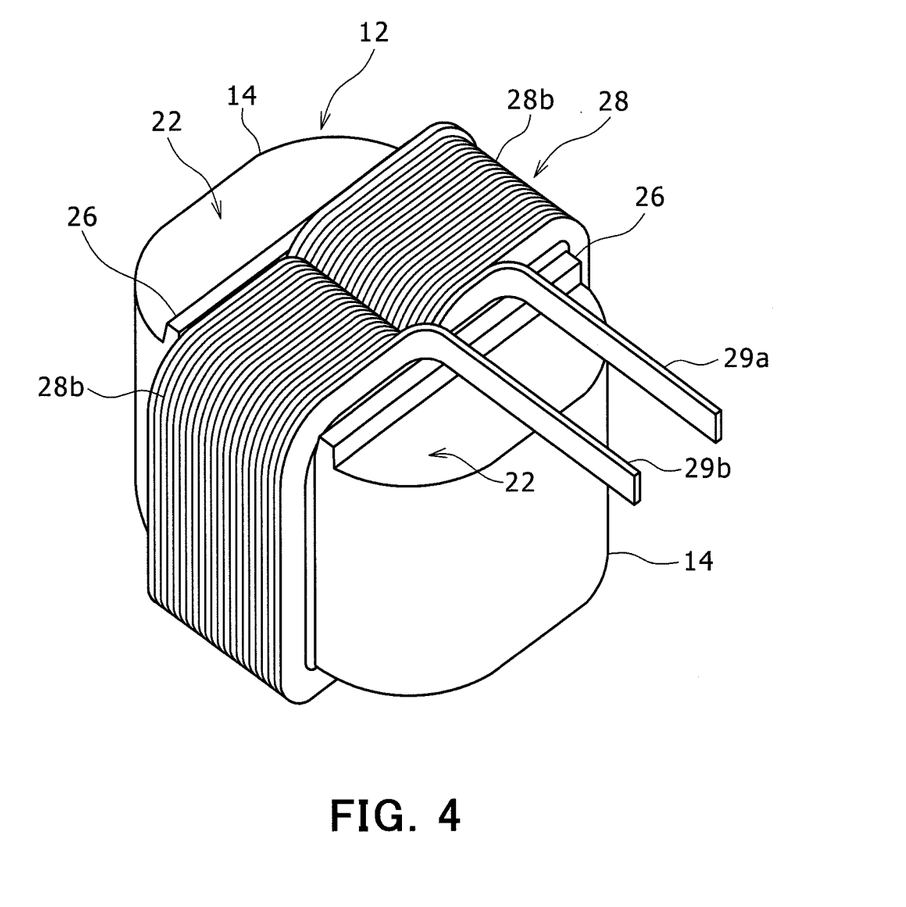
FIG. 4 is a perspective diagram showing a reactor core and a coil in which the core members, coil, and gap plates shown in FIG. 3 are assembled.

FIG. 4 is a perspective diagram showing the reactor core 12 and the coil 28 in which the core members 14, the coil 28, and the gap plates 30 shown in FIG. 3 are assembled. The reactor core 12 in which the two core members 14 are continuously provided to form an annular shape via the gap portions and the coil 28 provided around the leg portions 16, 18 including the gap portions are assembled by respectively inserting the leg portions 16, 18 into the coil portions 28a, 28b and joining the two core members 14 via the gap plates 30 and the adhesive agent layers as described above.

At this time, a narrow space is formed between the wall portions 26 of the first insert molding resin portions 22 of the core members 14 and the edge portions of the coil portions 28a, 28b. In this way, it becomes possible to allow a molten resin forming the second insert molding resin portion described below to flow into the interior of the coil portions 28a, 28b.

Figure 5:
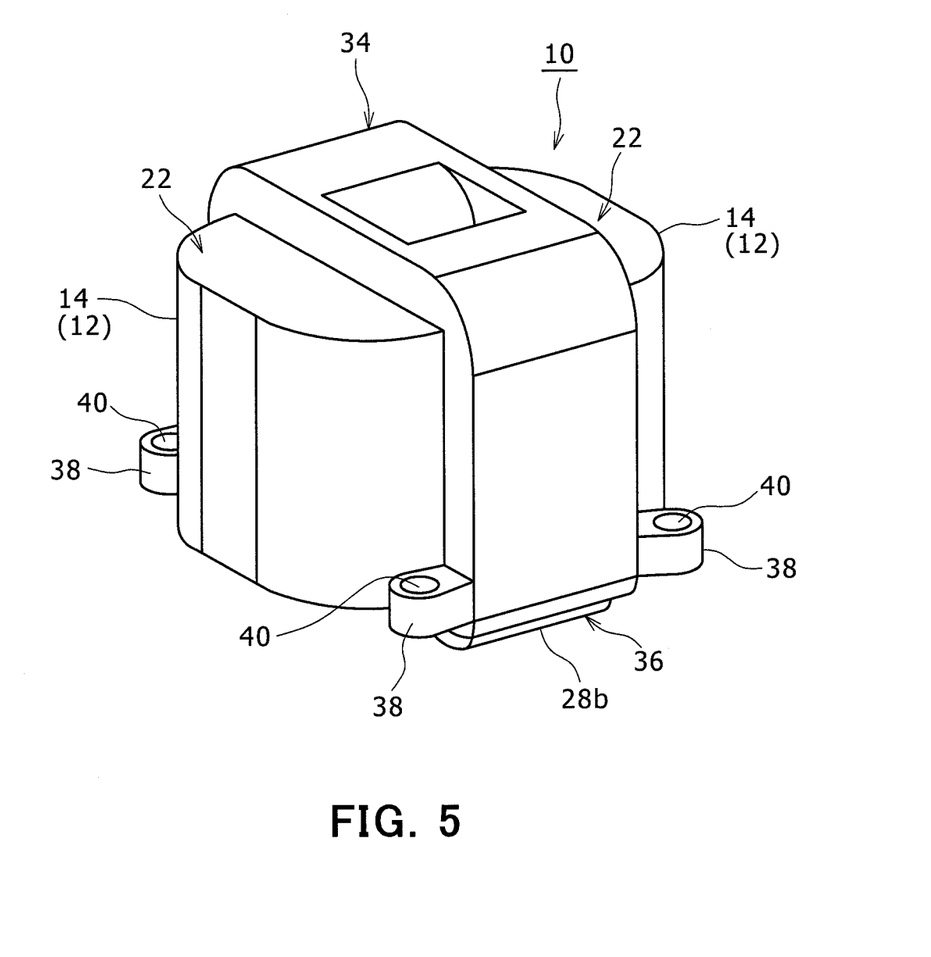
FIG. 5 is a perspective diagram showing a view in which a second insert molding resin portion is formed on the reactor core and the coil shown in FIG. 4 to fix the coil to the reactor core.
Figure 6:
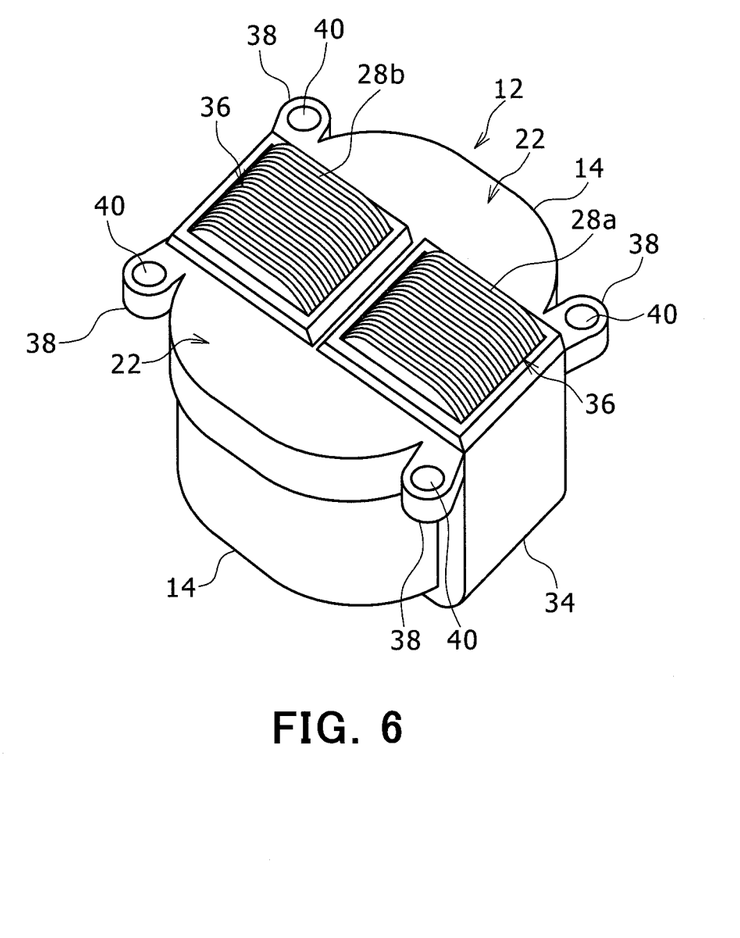
FIG. 6 is a perspective diagram showing a coil exposed portion formed on the bottom of the second insert molding resin portion.

FIG. 5 is a perspective diagram showing a view in which a second insert molding resin portion 34 is formed on the reactor core 12 and the coil 28 shown in FIG. 4 to fix the coil 28. In FIG. 5 (as well as in FIG. 7), wire end portions 29a, 29b extending out from the second insert molding resin portion 34 are omitted. FIG. 6 is a perspective diagram showing a coil exposed portion 36 formed under the second insert molding resin portion 34.

The second insert molding resin portion 34 is formed by placing the reactor core 12 and the coil 28 assembled as shown in FIG. 4 in another mold and injecting a thermoplastic resin. The second insert molding resin portion 34 may be formed from the same thermoplastic resin material as that of the first insert molding resin portions 22, or from a different thermoplastic resin material. Further, the second insert molding resin portion 34 is formed to cover generally the entire circumference of the coil portions 28a, 28b forming the coil 28. In this way, the two coil portions 28a, 28b forming the coil 28 are securely fixed to the annular reactor core 12. Further, because the second insert molding resin portion 34 is formed to cover the first insert molding resin portions 22 including the outer side of each of the wall portions 26, the two core members 14 are securely fixed with each other to be joined in an annular shape by an anchoring effect of the wall portions 26 embedded in the second insert molding resin portion 34. In this way, the manufacture of the reactor 10 is completed.

The two coil portions 28a, 28b forming the coil 28 are fixed to the reactor core 12 by the second insert molding resin portion 34 which is formed to cover the top, outer circumferential sides, and inner circumferential sides of the coil portions 28a, 28b. The second insert molding resin portion 34 also includes the coil exposed portion 36 in which the bottom of the coil portions 28a, 28b are not covered but are exposed. By providing the coil exposed portion 36 with the second insert molding resin portion 34 in this manner, it becomes possible to achieve good heat dissipation properties from the coil portions 28a, 28b.

As shown in FIGS. 5 and 6, two or more fastening portions 38 used to bolt the reactor 10 to the reactor mounting member are unitedly formed on the second insert molding resin portion 34 to be protruded therefrom. The present embodiment shows an example in which four fastening portions 38 are formed. Each of the fastening portions 38 includes a bolt insertion hole 40 formed therethrough. By unitedly forming the fastening portions 38 with the second insert molding resin portion 34 in this manner, it becomes unnecessary to separately provide fastening portions made from a metal plate, and thus, the number of required components can be reduced and cost reduction can be achieved. Although in the present embodiment, the fastening portions 38 are described to be unitedly formed with the second insert molding resin portion 34 as an example, the present invention is not limited to this example. The fastening portions may be unitedly formed with the exposed portions of the first insert molding resin portions 22 which are not covered with the second insert molding resin portion 34.

Figure 7:
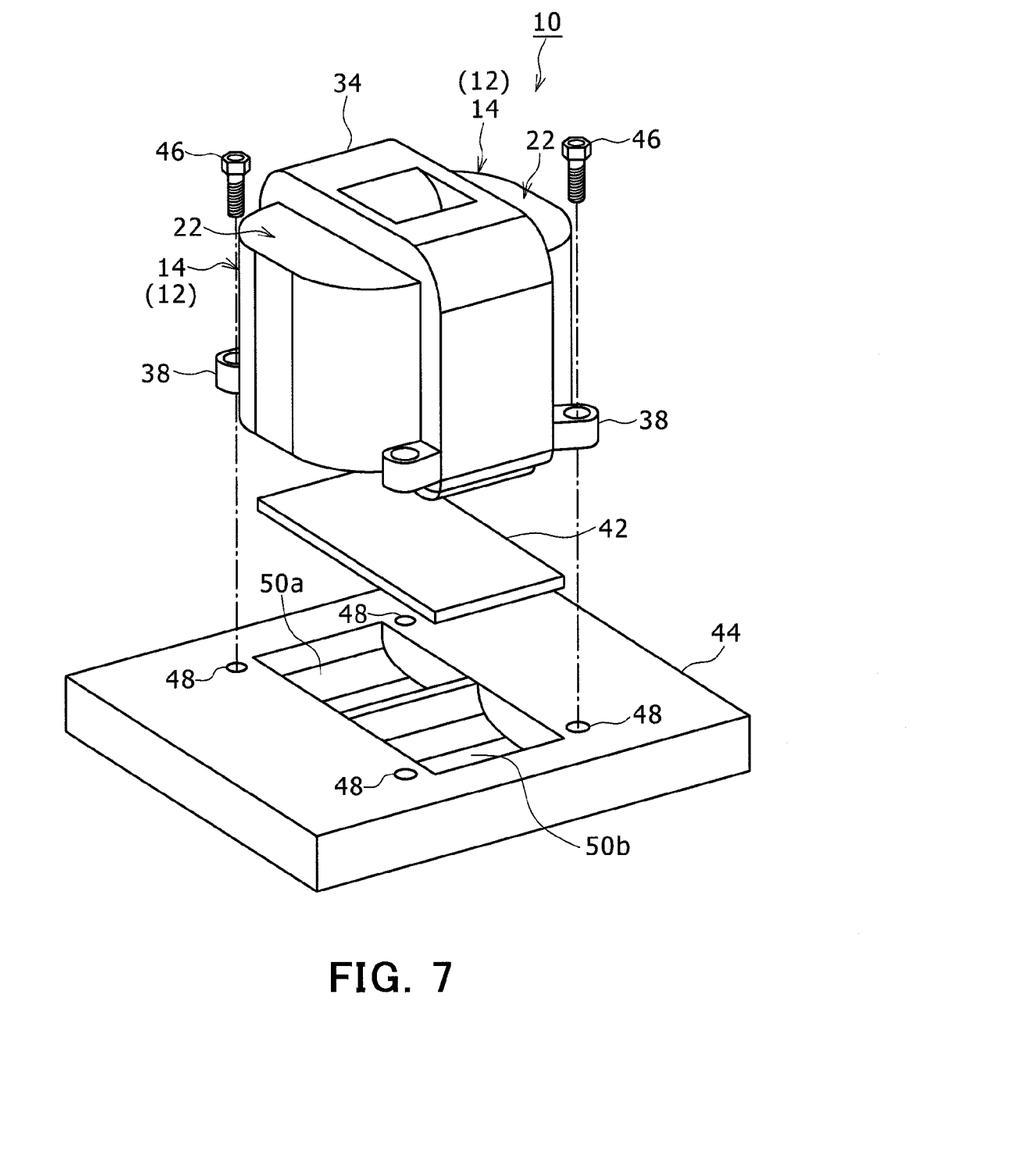
FIG. 7 is an exploded perspective diagram showing how the reactor with the coil fixed thereon is to be fixed with bolts on a metal case bottom plate via a heat dissipation material.
Figure 8:
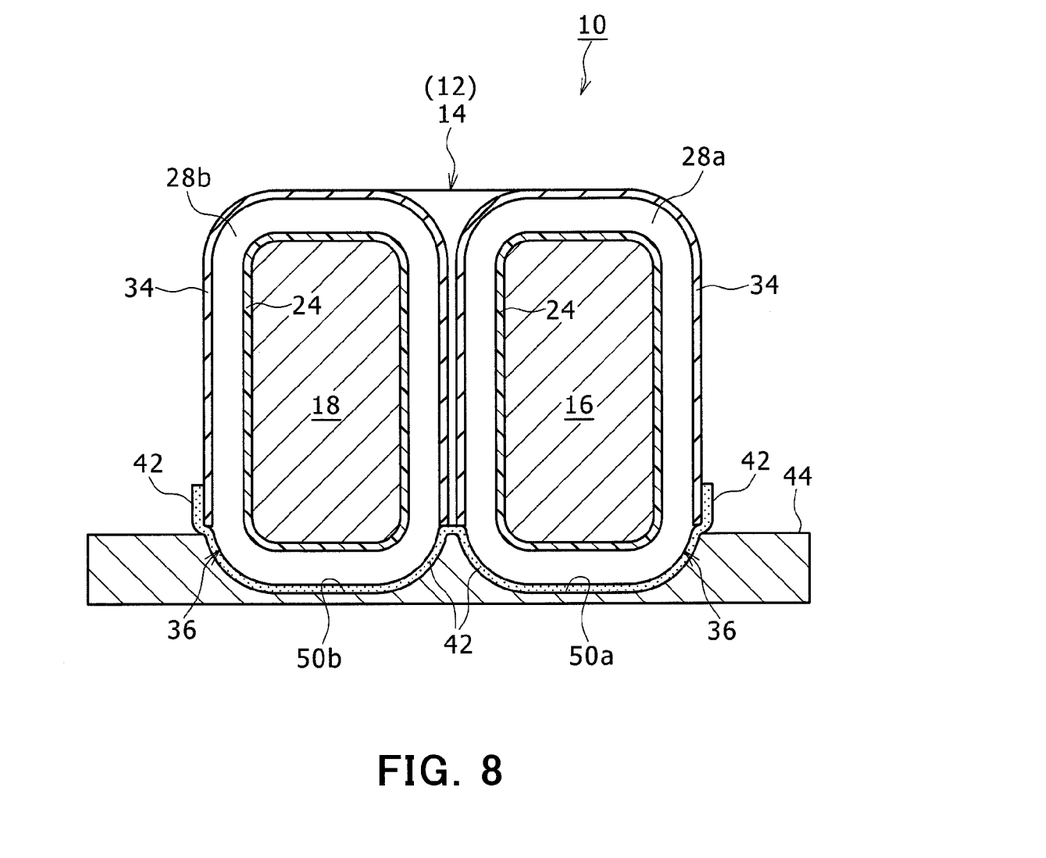
FIG. 8 is a vertical cross sectional view of a reactor fixed on the metal case bottom plate.

FIG. 7 is an exploded perspective diagram showing a view in which the reactor 10 with the coil 28 fixed thereon by the second insert molding resin portion 34 is to be fixed with bolts on a reactor mounting member 44 via a heat dissipation material 42. FIG. 8 is a vertical cross sectional view of the reactor 10 fixed on the reactor mounting member 44.

The reactor 10 manufactured in the above described manner is fixed on the reactor mounting member; that is, for example, a metal case bottom plate 44 made from aluminum alloy or the like, by inserting bolts 46 through the fastening portions 38 of the second insert molding resin portion 34 and securing the bolts 46 into female screw holes 48 formed on the reactor mounting member 44 with the sheet-type heat dissipation material 42 sandwiched therebetween.

The metal case bottom plate 44 includes mounting recess portions 50a, 50b which have a shape to fit the exposed portions of the coil portions 28a, 28b protruding in the coil exposed portion 36 provided with the second insert molding resin portion 34 of the reactor 10. In this way, as shown in FIG. 8, the bottom portions of the coil portions 28a, 28b which are not covered by the second insert molding resin portion but are exposed in the reactor 10 can be tightly attached to the metal case bottom plate 44 via the heat dissipation material 42. As a result, it becomes possible to achieve good heat dissipation from the coil portions 28a, 28b to the metal case bottom plate 44. Further, because the heat dissipation material 42 is also an insulation sheet, insulation properties between the coil portions 28a, 28b and the metal case bottom plate 44 can be achieved at the same time. It should be noted that, although a sheet-type heat dissipation material is preferably used in the present embodiment because of easy handling or the like, the present invention is not limited to this arrangement. For example, it is also possible to apply adhesive agent having thermal conductivity and insulation properties onto the mounting recessed portions in advance and use this adhesive agent layer as the heat dissipation material.

Although not shown in the drawings, the metal case bottom plate 44 is forcibly cooled by arranging the metal case bottom plate 44 to form a side wall of a cooler in which cooling water is supplied and circulated, or by providing the cooler to be adjacent to the back surface (that is, the surface facing the mounting surface of the reactor 10) side.

Next, a manufacturing method of the reactor 10 structured as described above is summarized below.

First, the two core members 14, the coil 28 including the coil portions 28a, 28b, and the two gap plates 30 are provided (refer to FIGS. 1 and 3).

Next, for the core members 14, the first insert molding resin portions 22 made from a thermoplastic resin is formed to cover the outer circumferential surface except for at least opposing surfaces of the core members (refer to FIG. 2).

Next, the two core members 14 are positioned such that the leg portions 16, 18 of one of the two core members 14 oppose those of the other core member 14. The leg portions 16, 18 are inserted into the coil portions 28a, 28b. The end surfaces 16a, 18a of the leg portions 16, 18 are fixed to the end surfaces 16a, 18a of the other leg portions 16, 18 with the adhesive agent 32 via the gap plates 30 (refer to FIGS. 3, 4).

Then, the second insert molding resin portion 34 made from a thermoplastic resin is formed with the reactor core 12 which includes the coil 28 arranged around the gap portions, so as to fix the coil portions 28a, 28b forming the coil 28 to the reactor core 12 (refer to FIG. 5). The manufacturing of the reactor 10 is completed with this step.

As described above, the reactor 10 according to the present embodiment is structured such that the gap plates 30 and the coil portions 28a, 28b positioned around the first insert molding resin portions 22 of the reactor cores 12 are fixed by the second insert molding resin portion 34 made from a thermoplastic resin. Therefore, the reactor 10 can be manufactured in a short cycle (for example, about 40 seconds to complete the insert moldings required for one reactor) by eliminating a potting process of thermosetting resin within a vacuum furnace and a thermosetting process within a heating furnace.

Further, in the reactor 10 according to the present embodiment, an insulation distance between the coil 28 and the core members 14 is ensured by the first insert molding resin portions 22 which cover around the leg portions 16, 18 of the core members 14 to which the coil 28 is attached. In this way, it becomes possible to omit a resin bobbin, because it is not required in assembling, to the reactor core, the coil in a state of being wound around an insulative resin bobbin.

Furthermore, it becomes possible to ensure good heat dissipation and insulation properties of the coil 28 by mounting the reactor 10 in such a manner that the coil exposed portion 36 is provided with the second insert molding resin portion 34 and the exposed coil 28 is tightly attached to the metal case bottom plate 44 with the heat dissipation material 42 having high thermal conductivity and insulation sandwiched therebetween.

Figure 9:
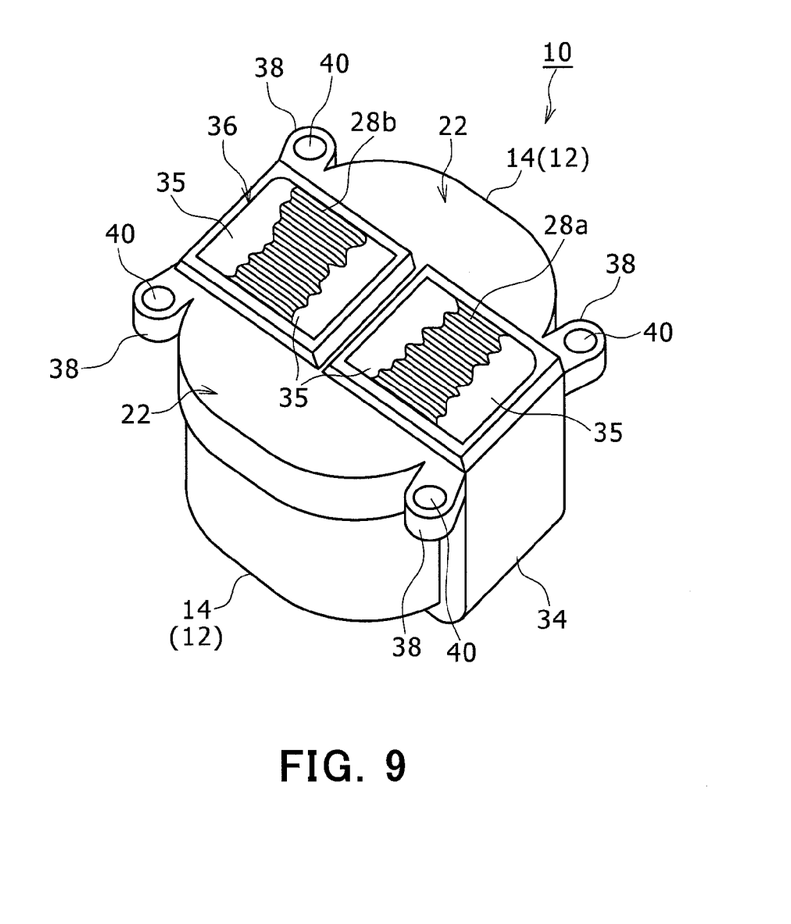
FIG. 9 is a perspective diagram, similar to FIG. 6, to show a view in which a mold flash portion is formed by a second insert molding resin portion excessively extended over a coil exposed portion.

By referring to FIGS. 9 and 10, variations of the above embodiments are described below. FIG. 9 is a perspective diagram, similar to FIG. 6, to show a view in which mold flash portions 35 are formed by the second insert molding resin portion 34 overflowing on the coil exposed portion 36.

Because the bottom portion of the coil portions 28a, 28b exposed in the coil exposed portion 36 has a curved outer surface, the mold flash portion 35 may be formed by a thermoplastic resin which overflows when forming the second insert molding resin portion 34 and partially covers exposed surface of the coil portions 28a, 28b.

In order to maintain good heat dissipation to the metal case bottom plate 44 via the heat dissipation material 42 even when the exposed portion of the coil portions 28a, 28b are partially covered by the mold flash portion 35, the second insert molding resin portion 34 may be formed from a thermoplastic resin material having heat conductivity higher than that of the first insert molding resin portions 22. In this case, the heat conductivity may be improved, for example, by mixing high conductivity particles such as silica in the same thermoplastic resin material with the first insert molding resin portions 22. In this way, material cost increase can be suppressed by using thermoplastic resin material having high heat conductivity for the second insert molding resin portion 34 alone.

Further, when the second insert molding resin portion 34 is formed from a thermoplastic material having high heat conductivity, the bottom portion of the coil portions 28a, 28b may also be covered with the second insert molding resin portion 34 without providing the coil exposed portion as in the reactor in the above embodiment. In this case, insulation properties can be improved by the second insert molding resin portion 34 sandwiched between the coil portions 28a, 28b and the metal case bottom plate 44. Further, in this case, the heat dissipation material 42 may have slightly lower insulation properties, so long as the material has high heat conductivity. This allows cost reduction of the heat dissipation material.

Figure 10:
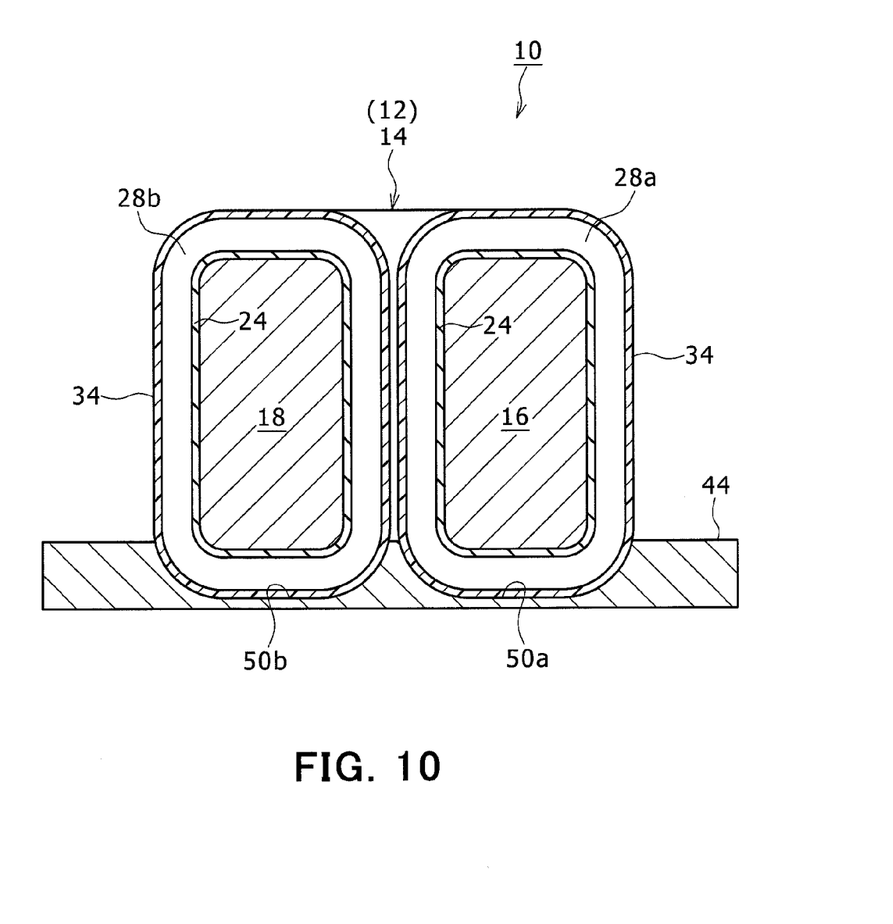
FIG. 10 is a vertical cross sectional view, similar to FIG. 8, showing a reactor which is directly mounted on a metal case bottom plate with a coil not exposed but covered with a second insert molding resin.

Further, when the second insert molding resin portion 34 is formed to also cover the bottom portions of the coil portions 28a, 28b, the reactor 10 may be directly mounted on the metal case bottom plate 44 as shown in FIG. 10. In this way, it becomes possible not only to omit the heat dissipation material, and thus to achieve cost reduction and facilitate assembly, but also to improve heat dissipation properties from the coil 28 to the metal case bottom plate 44.

Although embodiments and variations of the present invention are described above, reactors according to the present invention are not limited to the above described structures. Various changes and improvements are further possible.

For example, although the first insert molding resin portions 22 are described above to be formed to cover the entire outer circumferential surface of the core members 14 except for the end surfaces 16a, 18a, reactors according to the present invention are not limited to this arrangement. The connecting portion 20 of the core members 14 may be entirely or partially exposed by forming the first insert molding resin portions at the portions corresponding to the leg cover portions 24 and the wall portions 26 alone. By exposing the core members in this manner, there can be achieved an advantage that heat dissipation from the core members is improved.

Further, although the bottom portions of the coil portions 28a, 28b are exposed by providing the coil exposed portion 36 at the bottom of the second insert molding resin portion 34, the reactor 10 shown in FIG. 5 may be mounted in the vertically inverted direction (that is, in the direction shown in FIG. 6) when the reactor is mounted on the bottom surface of the metal case bottom plate 44.

Further, although in the above embodiments, the reactor core 12 is described in an example in which the reactor core 12 is formed by the two U-shaped core members 14, the reactor core 12 is not limited to this arrangement. One or more rectangular core members may be provided between the two U-shaped core members to form the reactor core. In this case, the reactor includes three or more gap portions. Further, in this case, a first insert molding resin portion may be formed on the outer circumference except for the opposing surfaces of the rectangular core members in a manner similar to the above described leg cover portions 24. Then, after joining all of the core members in an annular shape, a second insert molding resin portion may be formed to fix the coil to the reactor core.

REFERENCE NUMERALS 10 reactor; 12 reactor core; 14 core member; 16 first leg portion; 18 second leg portion; 16a, 18a end surfaces; 20 connecting portion; 22 first insert molding resin portion; 24 leg cover portion; 25a recess portion; 25b protruding portion; 26 wall portion; 28 coil; 28a, 28b coil portions; 29a, 29b wire end portions; 30 gap plate; 32 adhesive agent; 34 second insert molding resin portion; 35 mold flash portion; 36 coil exposed portion, 38 fastening portion; 40 bolt insertion hole; 42 heat dissipation material, 44 reactor mounting member or metal case bottom plate; 46 bolt; 48 female screw hole; and 50a, 50b mounting recess portions.

The invention claimed is:

1. A reactor comprising:
a reactor core formed by a plurality of core members which are joined in an annular shape via gap portions;
a first insert molding resin portion made from a thermoplastic resin fixed to cover an outer circumferential surface of the core member except for at least opposing surfaces of the core members;
a coil positioned around the gap portions and the first insert molding resin portion of the reactor core; and
a second insert molding resin portion which is insert molded by using a mold around the coil to fix the core members in a state that the core members are joined each other in the annular shape and to fix the coil to the reactor core, the second insert molding resin portion being made from a thermoplastic resin,
wherein a part of the coil is arranged to be a coil exposed portion which protrudes from the second insert molding resin portion so as to be fitted to a mounting recess portion of a reactor mounting member on which the reactor is mounted after the second insert molding resin portion is formed by using the mold.

2. The reactor according to claim 1, wherein
the plurality of core members comprise at least two U-shaped core members, each unitedly made from a magnetic material, a protruding wall portion is formed on a surface of the first insert molding resin portion disposed on each of the U-shaped core members, the wall portion having a function to position the coil with respect to the reactor core formed by the core members assembled in the annular shape, the second insert molding resin portion is formed to cover the first insert molding resin portion including an outer side of the wall portion formed on each of the two U-shaped core members.

3. The reactor according to claim 1, wherein
the second insert molding resin portion is made from a resin material having thermal conductivity higher than that of the first insert molding resin portion.

4. The reactor according to claim 1, wherein
the first insert molding resin portion or the second insert molding resin portion includes a fastening portion unitedly formed therewith, to bolt the reactor onto the reactor mounting member.

5. A method for manufacturing a reactor comprising a reactor core formed by a plurality of core members which are joined in an annular shape via gap portions and a coil provided around the reactor core including the gap portions, the method comprising:

preparing the plurality of core members and the coil;

forming a first insert molding resin portion made from a thermoplastic resin to fix so as to cover an outer circumferential surface of the core members except for at least opposing surfaces of the core members;

joining the plurality of core members in an annular shape via the gap portions with the core members inserted into the coil; and forming a second insert molding resin portion made from a thermoplastic resin by using a mold around the coil positioned around the gap portions and the first insert molding resin portion of the reactor core to fix the core members in a state that the core members are joined each other in the annular shape and to fix the coil to the reactor core, wherein in the second insert molding of the reactor, a part of the coil is arranged to be a coil exposed portion which protrudes from the second insert molding resin portion so as to be fitted to a mounting recess portion of a reactor mounting member on which the reactor is mounted after the second insert molding resin portion is formed by using the mold.

6. The method for manufacturing the reactor according to claim 5, wherein
the plurality of core members comprise at least two U-shaped core members, each unitedly made from a magnetic material, a protruding wall portion is formed on a surface of the first insert molding resin portion disposed on each of the U-shaped core members, the wall portion having a function to position the coil with respect to the reactor core formed by the core members assembled in the annular shape, the second insert molding resin portion is formed to cover the first insert molding resin portion including an outer side of the wall portion formed on each of the two U-shaped core members.

7. The method for manufacturing the reactor according to claim 5, wherein
the second insert molding resin portion is made from a resin material having heat conductivity higher than that of the first insert molding resin portion.

8. The method for manufacturing the reactor according to claim 5, wherein
when forming the first insert molding resin portion or the second insert molding resin portion, a fastening portion to bolt the reactor to the reactor mounting member is unitedly formed.

* * * * *